United States Patent
Hintz et al.

(10) Patent No.: US 10,215,258 B2
(45) Date of Patent: Feb. 26, 2019

(54) DRAWSTRING TIGHTENER

(71) Applicants: Christopher James Hintz, Savannah, GA (US); Tausha Lynn Hintz, Savannah, GA (US)

(72) Inventors: Christopher James Hintz, Savannah, GA (US); Tausha Lynn Hintz, Savannah, GA (US)

(*) Notice: Subject to any disclaimer, the term of this patent is extended or adjusted under 35 U.S.C. 154(b) by 338 days.

(21) Appl. No.: 14/975,814

(22) Filed: Dec. 20, 2015

(65) Prior Publication Data
US 2016/0198802 A1    Jul. 14, 2016

Related U.S. Application Data

(60) Provisional application No. 62/101,264, filed on Jan. 8, 2015.

(51) Int. Cl.
| A43C 7/08 | (2006.01) |
| A43C 9/00 | (2006.01) |
| A41F 9/02 | (2006.01) |
| F16G 11/12 | (2006.01) |
| F16G 11/04 | (2006.01) |

(52) U.S. Cl.
CPC ............ F16G 11/12 (2013.01); F16G 11/046 (2013.01); *Y10T 24/2187* (2015.01); *Y10T 24/2194* (2015.01)

(58) Field of Classification Search
CPC .... F16G 11/12; F16G 11/046; Y10T 24/2187; Y10T 24/2194
See application file for complete search history.

(56) References Cited

U.S. PATENT DOCUMENTS

| 1,524,108 | A | * | 1/1925 | Rowland | B60D 1/187 24/129 R |
| 1,546,798 | A | * | 7/1925 | Seagren | F16G 11/14 24/129 B |
| 1,806,162 | A | * | 5/1931 | Hahn | A43C 7/04 24/129 B |
| 1,814,978 | A | * | 7/1931 | Swanson | A44B 11/04 132/59 |
| 2,193,236 | A | * | 3/1940 | Meighan | F16G 11/14 24/129 R |
| 3,267,540 | A | * | 8/1966 | Wolcott | B65D 63/14 24/130 |
| 3,930,288 | A | * | 1/1976 | Black | B66C 1/12 24/129 R |
| 3,953,911 | A | * | 5/1976 | Fishack | F16G 11/14 24/130 |
| 4,280,435 | A | * | 7/1981 | Loomis | B63B 21/04 114/219 |
| 9,468,283 | B2 | * | 10/2016 | Meillan | A45F 3/22 |
| 2011/0160856 | A1 | * | 6/2011 | Sinnott | A61B 17/0487 623/13.14 |
| 2015/0176678 | A1 | * | 6/2015 | Burrell | F16G 11/046 24/129 R |

* cited by examiner

*Primary Examiner* — Robert Sandy
*Assistant Examiner* — Louis A Mercado

(57) ABSTRACT

A rotatable cord tensioning device is disclosed which is configured to include apertures for affixing one or more cords. Other apertures in the rotatable cord tensioning device are disclosed for securing the cord tensioning device in a rotated position. The rotation of the cord tensioning device tensions the cord by effectively shortening the length of the cord.

13 Claims, 15 Drawing Sheets

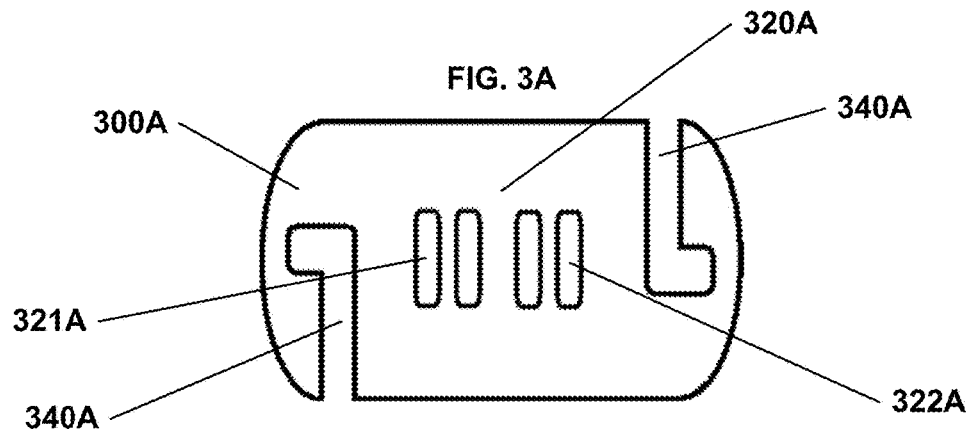
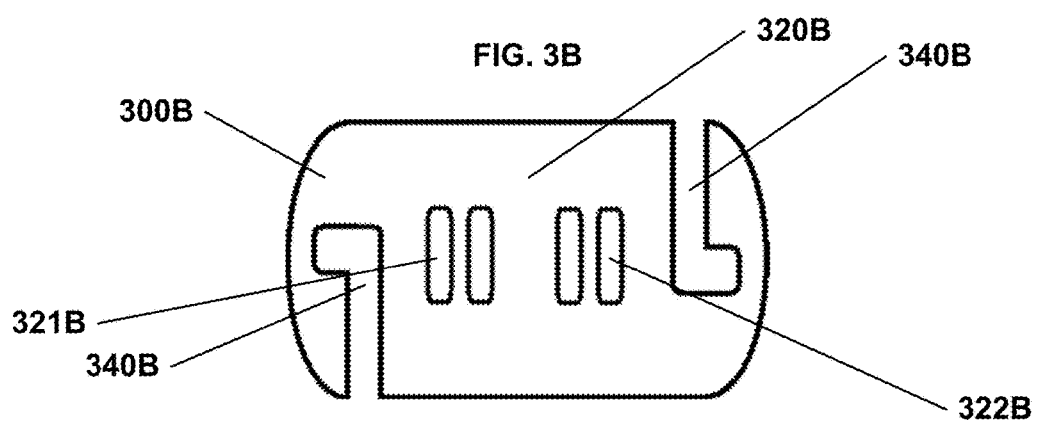
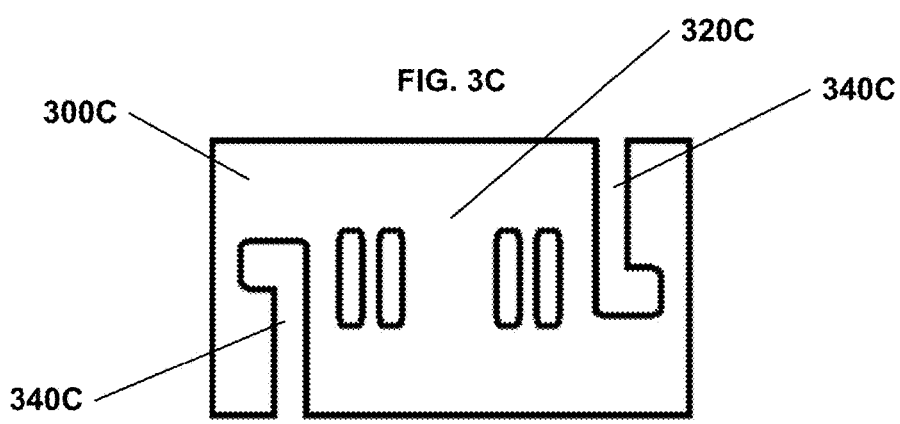
FIG. 3

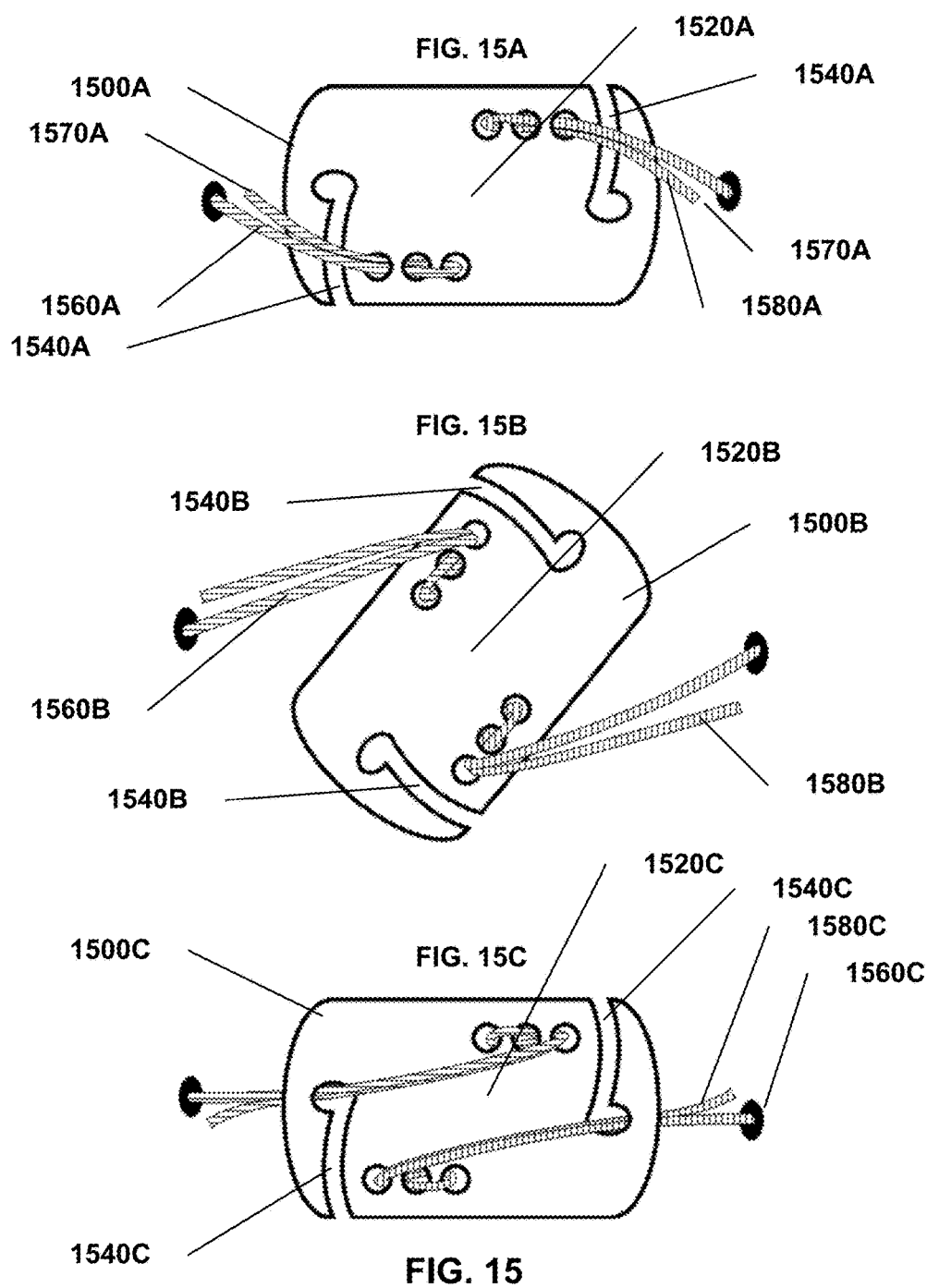

DRAWSTRING TIGHTENER

CROSS-REFERENCE TO RELATED APPLICATIONS

This application claims priority from U.S. Provisional Patent Application No. 62/101,264, filed on Jan. 8, 2015, the entirety of which is hereby incorporated herein by reference.

BRIEF DESCRIPTION OF THE DRAWINGS

FIGS. 3A, 3B, and 3C are each a front view of several embodiments of a cord tensioning device comprising an irregular shaped (FIGS. 3A and 3B)/regular shaped (FIG. 3C) device body, and further comprising rectangular shaped apertures and L-shaped recessed slots.

FIGS. 15A, 15B, and 15C are each a front view illustrating another embodiment of the method steps of tightening a cord around an object.

DETAILED DESCRIPTION

Embodiments described herein relate to cord tensioning devices and methods of tightening a cord about an object.

Additionally, although various embodiments of cord tensioning devices are described herein, the various components, features, or other aspects of the embodiments of the cord tensioning devices described herein may be combined or interchanged to form additional embodiments of cord tensioning devices not explicitly described herein, all of which are contemplated as being a part of the present disclosure.

Cord Tensioning Device

Figure 1:
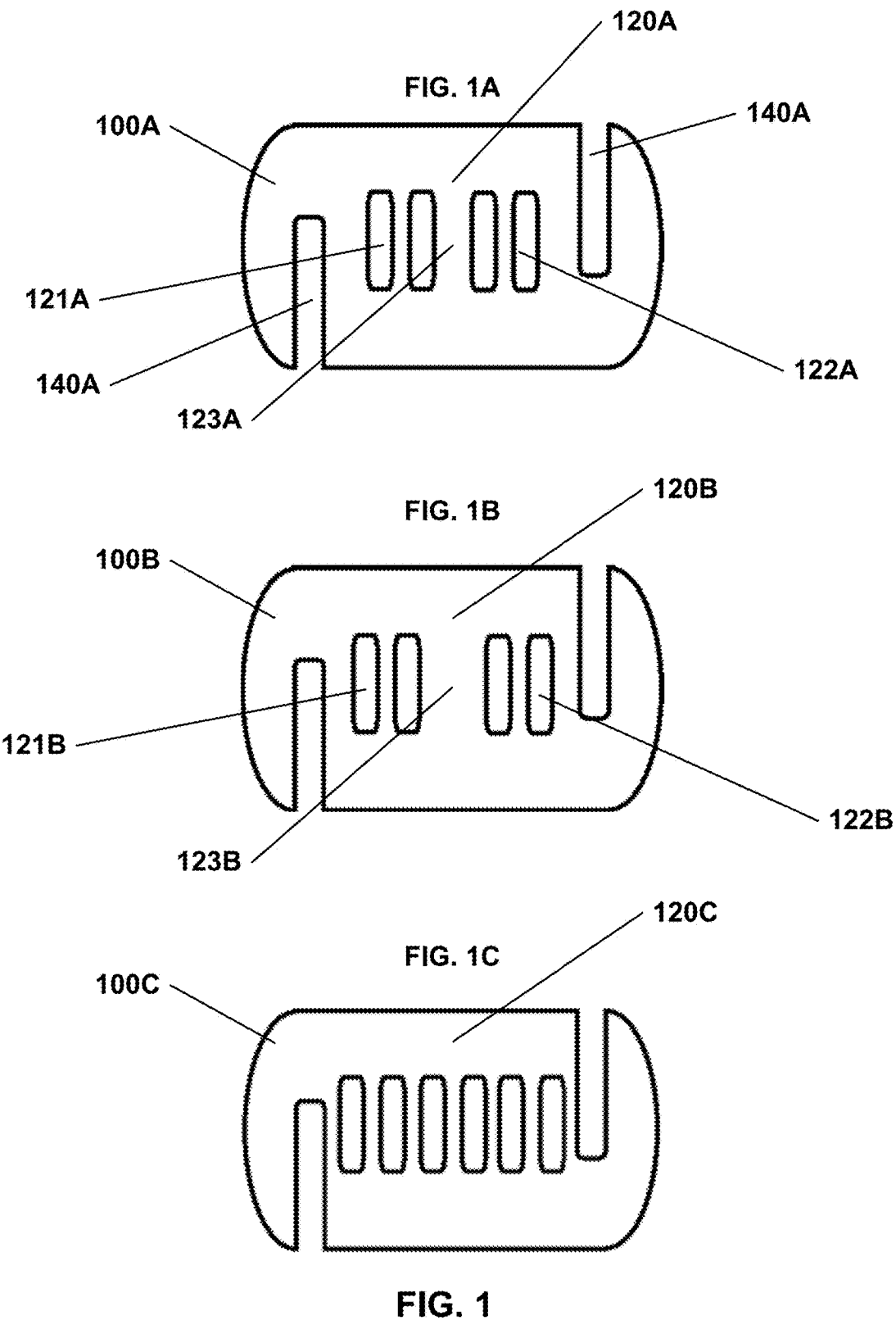
FIGS. 1A, 1B, and 1C are each a front view of several embodiments of a cord tensioning device comprising an irregular shaped device body, and rectangular shaped apertures and recessed slots.
Figure 13:
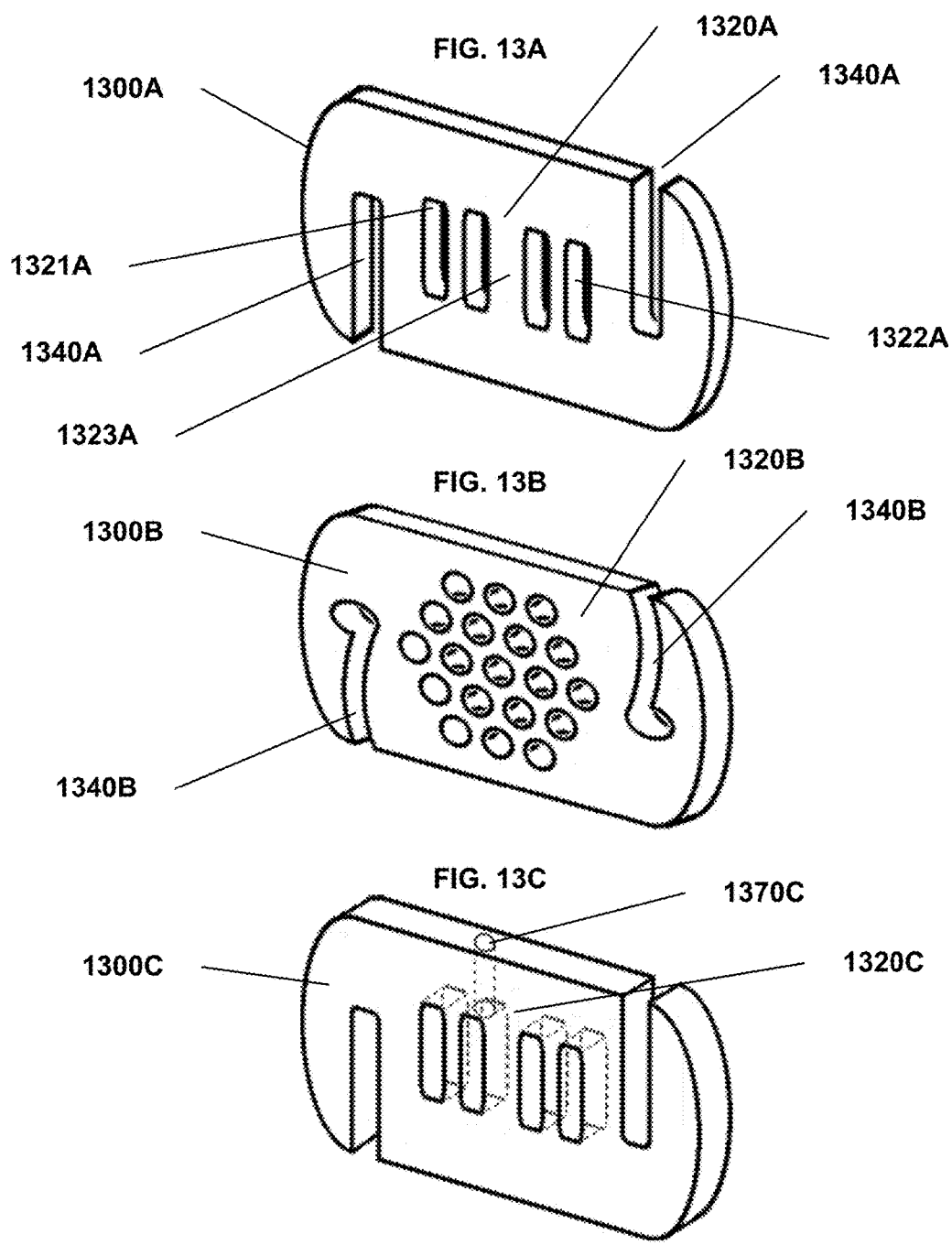
FIG. 13A is a perspective view of the cord tensioning device illustrated in FIG. 1A.
FIG. 13B is a perspective view of the cord tensioning device illustrated in FIG. 10B.
FIG. 13C is a perspective view of an embodiment of a cord tensioning device comprising an irregular shaped device body, rectangular shaped apertures, a circular aperture extending from an edge of the device body to a rectangular shaped aperture, and rectangular shaped recessed slots.

FIGS. 1A and 13A each depict one embodiment where the device body 100A and 1300A may comprise an irregular shape and may contain four centrally located apertures 120A and 1320A disposed along a horizontal line through the center of the device body 100A and 1300A (going from the left edge to the right edge of the device body 100A and 1300A). Each of the four apertures 120A and 1320A may comprise a regular shape, and the apertures may be biased to the left and right edge having spacings that are non-uniform (i.e. going from left to right, the first and second apertures 121A and 1321A may be located closer to the left edge of the body, and the third and fourth apertures 122A and 1322A may be located closer to the right edge of the body, where the spacing between the first and second apertures 121A and 1321A may be the same as the spacing between the third and fourth apertures 122A and 1322A, but the spacing between the second and third apertures 123A and 1323A may be larger than the other spacings between the other apertures 121A and 1321A). This embodiment may further comprise two regularly shaped recessed slots 140A and 1340A in the device body 100A and 1300A, one of which may be disposed along the top right edge of the device body 100A and 1300A extending toward the bottom of the device body 100A and 1300A and the other of which may be disposed along the bottom left edge of the device body 100A and 1300A extending toward the top of the device body 100A and 1300A.

The cord tensioning device embodiments may comprise a rigid or semi-rigid body having front and back sides, and left, right, top, and bottom edges of a predetermined length, width, and/or thickness. The rigid body may be comprised of any rigid material, i.e., plastics, metals, rubbers, and any other known suitable materials and/or combination of materials that would provide the device body with sufficient strength and rigidity to withstand a pulling force applied to the body and/or to a portion of the body, without fracturing, significantly deforming, and/or substantially damaging the device body. The front and back sides, and the left, right, top and bottom edges of the device body may have either a regular or irregular shape, and/or any combination of regular and/or irregular shapes. As used herein, the term "regular shape" shall mean any basic geometric shape that is substantially circular, rectangular, elliptical, triangular, or trapezoidal in form, or that is substantially a regular polygon (having equal side lengths and equal interior angles); the term "irregular shape" shall mean any shape that may be generally created from straight lines or curved lines (or combination thereof) that results in a shape not categorized within the definition of "regular shape". According to certain embodiments, the device body may comprise a regular shape, e.g., rectangular. In some embodiments, the device body may comprise an irregular shape, e.g., substantially rectangular with chamfered corners and curved sides.

The apertures 120A and 1320A may be located within a central portion of the device body 100A and 1300A, biased toward a right and/or left side of the device body 100A and 1300A, or placed randomly throughout the device body 100A and 1300A. The apertures 120A and 1320A may be located along a horizontal line of the device body 100A and 1300A (going from the left edge to the right edge of the device body 100A and 1300A), along a vertical line of the device body 100A and 1300A (going from the top edge to the bottom edge of the device body 100A and 1300A), or along a slanted line of the device body 100A and 1300A (going from the left edge to the right edge, or the top edge to the bottom edge, at an angle), and/or any combination thereof. According to certain embodiments, the device body 100A and 1300A may comprise apertures 120A and 1320A that comprise regular, irregular, and/or any combination of regular and irregular shapes. The apertures 120A and 1320A may be spaced apart from one another, and the spacing between the apertures 120A and 1320A may be evenly or randomly distributed. According to certain embodiments, the apertures 120A and 1320A may be centrally located having uniform spacings between apertures.

According to certain embodiments, the device body 100A and 1300A may comprise at least one recessed slot 140A and 1340A disposed in the device body 100A and 1300A and may extend from any edge of the device body 100A and 1300A toward the center of the device body 100A and 1300A, or to any other edge of the device body 100A and 1300A. According to certain embodiments, the device body 100A and 1300A may comprise at least two recessed slots 140A and 1340A disposed in the body. According to certain embodiments, the device body 100A and 1300A may comprise at least two recessed slots 140A and 1340A with a first of said at least two recessed slots 140A and 1340A extending from the top edge of the device body 100A and 1300A, and a second of said at least two recessed slots 140A and 1340A extending from the bottom edge of the device body 100A and 1300A. According to certain embodiments, the first and second recessed slots 140A and 1340A may be located on opposing edges of the device body 100A and 1300A, e.g., the top edge near the right edge, and the bottom edge near the left edge of the device body 100A and 1300A.

The recessed slots 140A and 1340A may comprise regular, irregular, and/or any combination of regular and irregular shapes. According to certain embodiments, the recessed slots may comprise rectangular (regular) shapes 140A, while in other embodiments, the recessed slots may comprise curved L-shaped (irregular) shapes 1340A.

FIG. 1B depicts an embodiment that is substantially the same as FIG. 1A, except that the spacing between the second and third apertures 123B of the four apertures 120B may be greater than that of FIG. 1A, such that the two sets of apertures 120B may be biased even more (the first and second apertures 121B are biased more to the left edge of the device body 100B, and the third and fourth apertures 122B are biased more to the right edge of the device body 100B).

FIG. 1C depicts an embodiment similar to FIGS. 1A and 1B, except this embodiment comprises six (6) centrally located apertures 120C spaced evenly apart.

Figure 2:
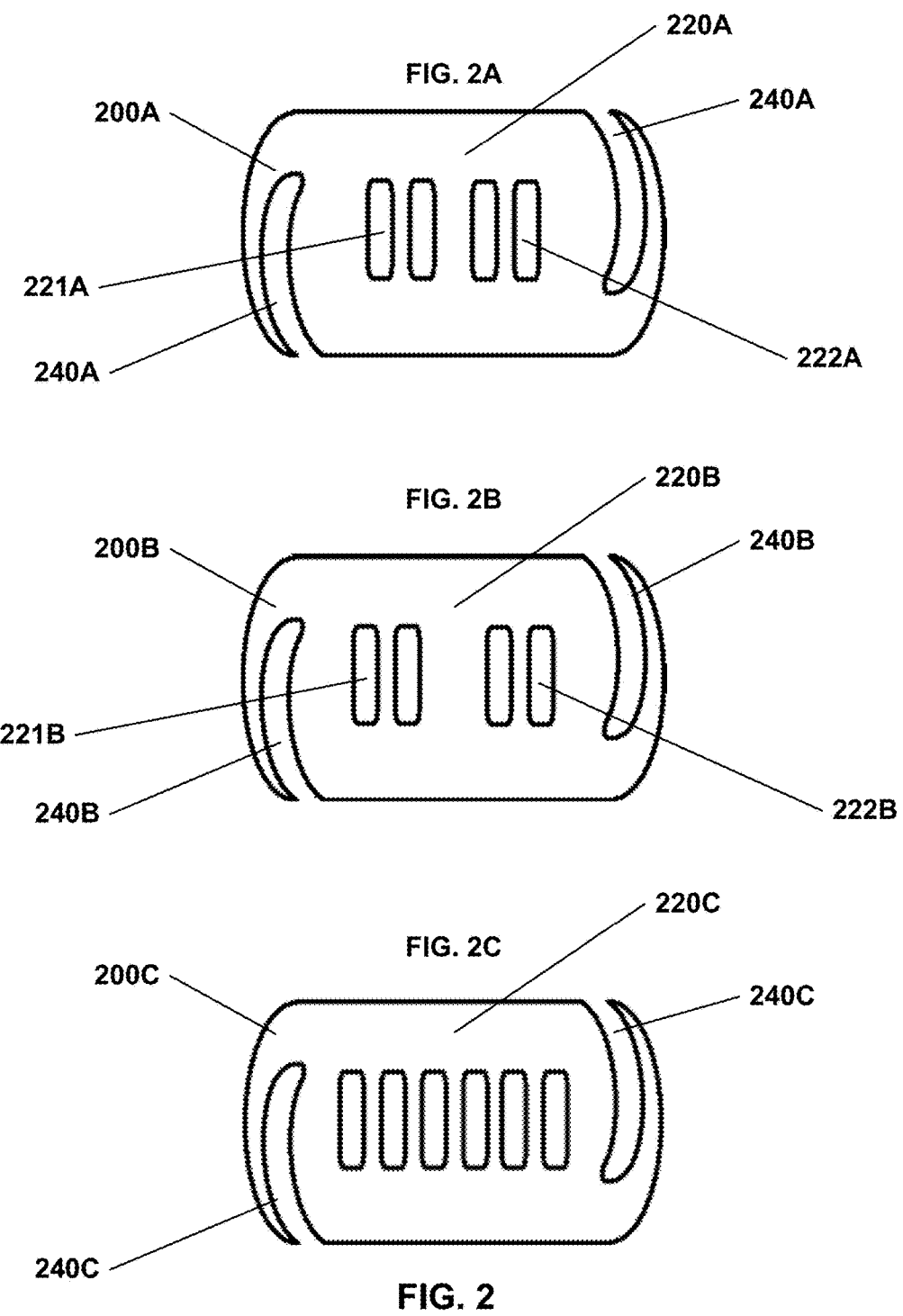
FIGS. 2A, 2B, and 2C are each a front view of several embodiments of a cord tensioning device comprising an irregular shaped device body, rectangular shaped apertures and irregularly shaped curved recessed slots.

FIGS. 2A, 2B, and 2C each depict embodiments that are substantially the same as FIGS. 1A 1B, and 1C, respectively, except that the device body 200A, 200B, and 200C, respectively, may comprise irregularly shaped recessed slots 240A that may curve outward from the center of the device body 200A, 200B, and 200C, respectively.

FIGS. 3A and 3B each depict embodiments that are substantially the same as FIGS. 1A and 1B, respectively, except that in FIGS. 3A and 3B, the device body 300A and 300B may comprise irregularly shaped recessed slots 340A and 340B. In this case, the recessed slots 340A and 340B may resemble an L-shape, comprised of straight lines and chamfered corners. This irregular shape in the recessed slots 340A and 340B is an example of the combination of two regular shapes to create an irregular shape, where the portion of the recessed slot 340 that extends horizontally away from the center of the device body 300A, 300B, 300C may provide a barb-like effect to help hold the cord in its tightened state. FIG. 3C is substantially the same as FIG. 3B, except that the device body 300C may comprise a regular shape.

Figure 4:
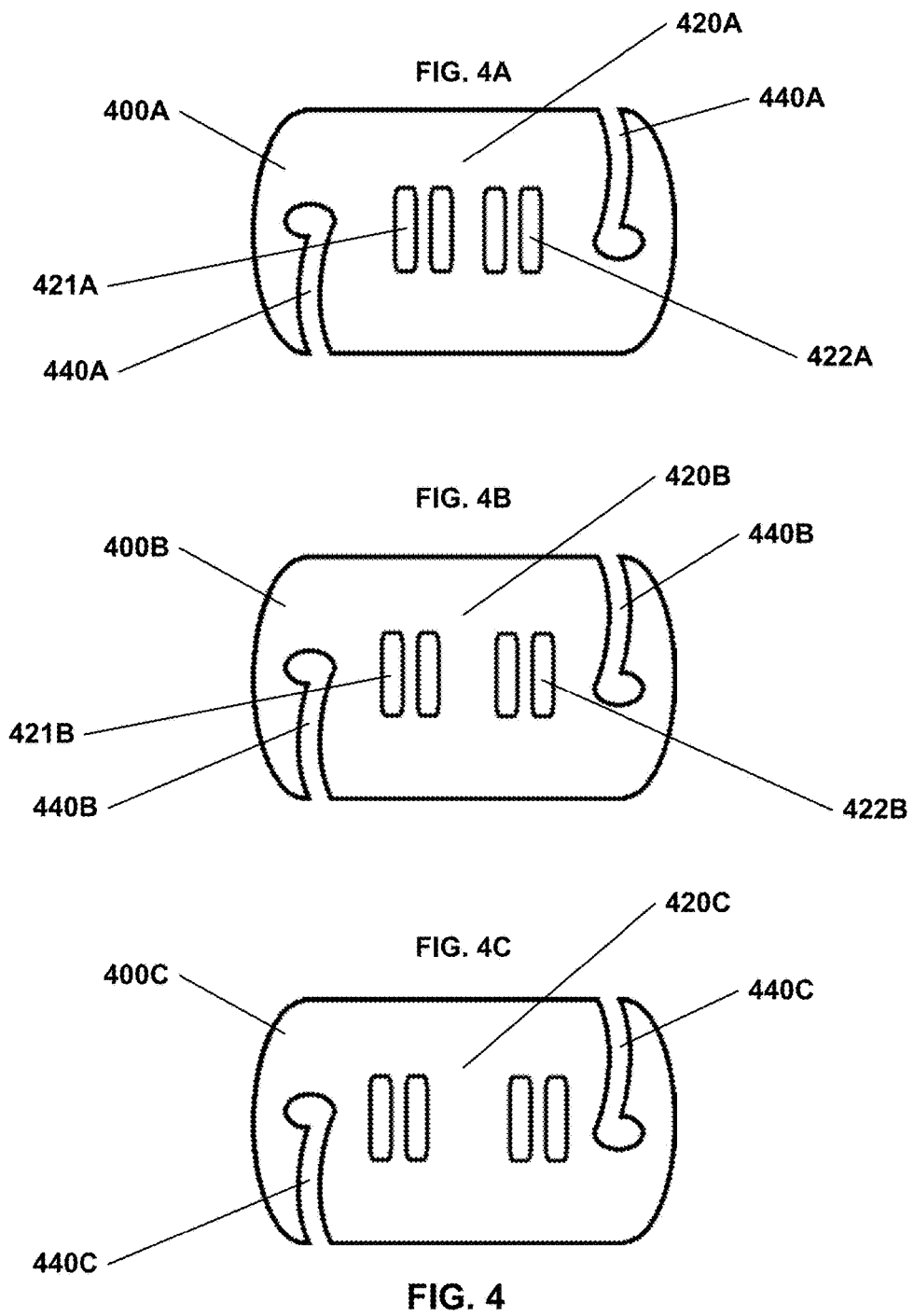
FIGS. 4A, 4B, and 4C are each a front view of several embodiments of a cord tensioning device comprising an irregular shaped device body, rectangular shaped apertures and irregular, curved L-shaped recessed slots.

FIGS. 4A, 4B, and 4C each depict embodiments that are substantially the same as FIGS. 3A, 3B, and 3C, respectively, except that the device body 400A, 400B, and 400B 400C in FIGS. 4A, 4B, and 4C depicts another example of irregularly shaped recessed slots 440A, 440B, and 440C resembling a curved L-shape comprised of curved lines and an ellipse. Also, in contrast to the regularly shaped device body 300C from FIG. 3C, the device body 400C in FIG. 4C may be irregularly shaped.

Figure 5:
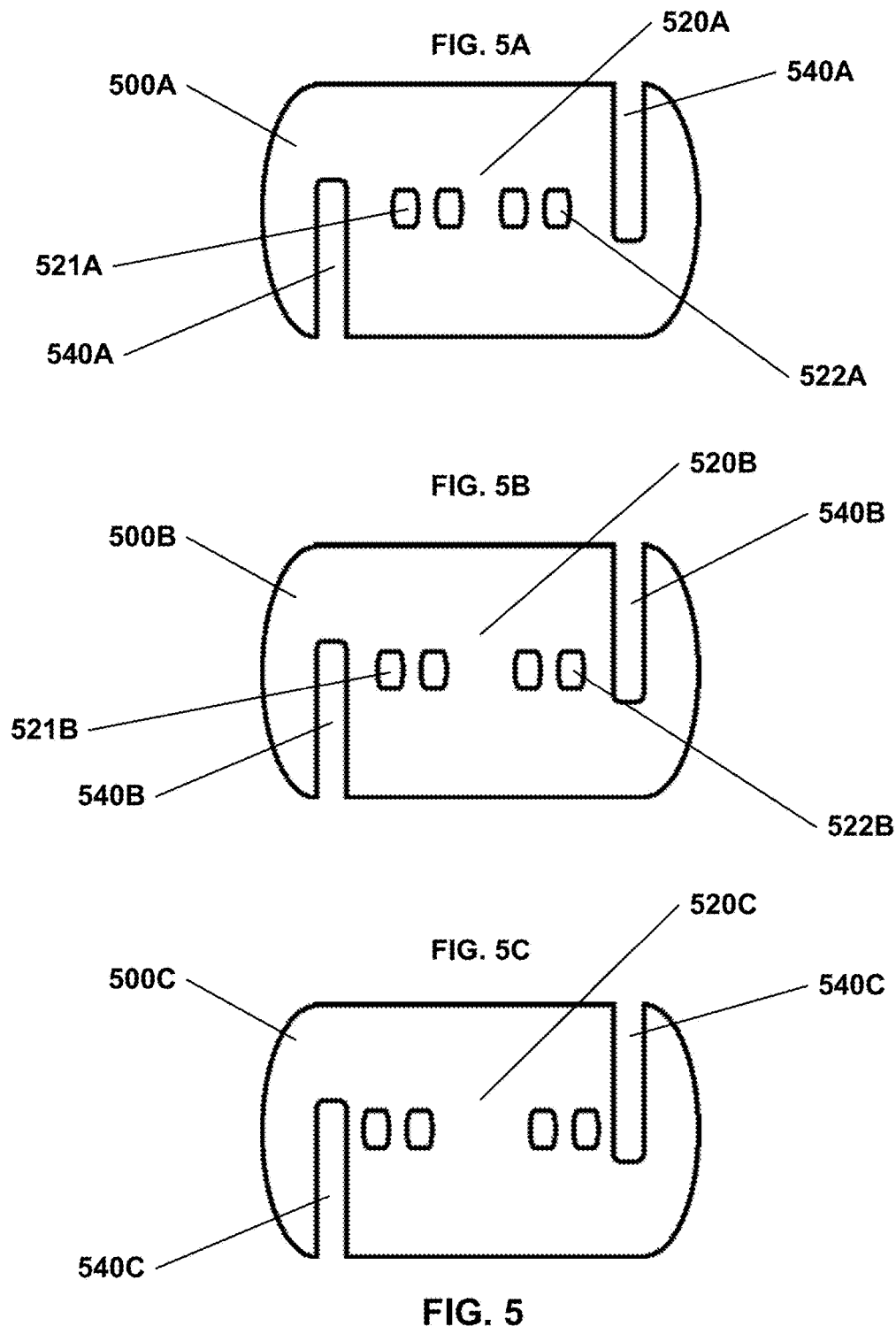
FIGS. 5A, 5B, and 5C are each a front view of several embodiments of a cord tensioning device comprising an irregular shaped device body, square shaped apertures and rectangular shaped recessed slots.

FIGS. 5A, 5B, and 5C each depict embodiments that are substantially the same as FIGS. 4A, 4B, and 4C, respectively, except that in the device body 500A, 500B, and 500C in FIGS. 5A, 5B, and 5C the four apertures 520A, 520B, and 520C may comprise a regular shape of a different size. Moreover, each of the embodiments in FIGS. 5A, 5B, and 5C may comprise two regular shaped recessed slots 540A, 540B, and 540C in the device body 500A, 500B, and 500C where one of said recessed slots 540A, 540B, and 540C may be disposed along the top right edge of the device body 500A, 500B, and 500C extending in a straight vertical downward direction toward the bottom edge of the device body 500A, 500B, and 500C and the other of which may be disposed along the bottom left edge of the device body 500A, 500B, and 500C extending in a straight vertical upward direction toward the top edge of the device body 500A, 500B, and 500C.

Figure 6:
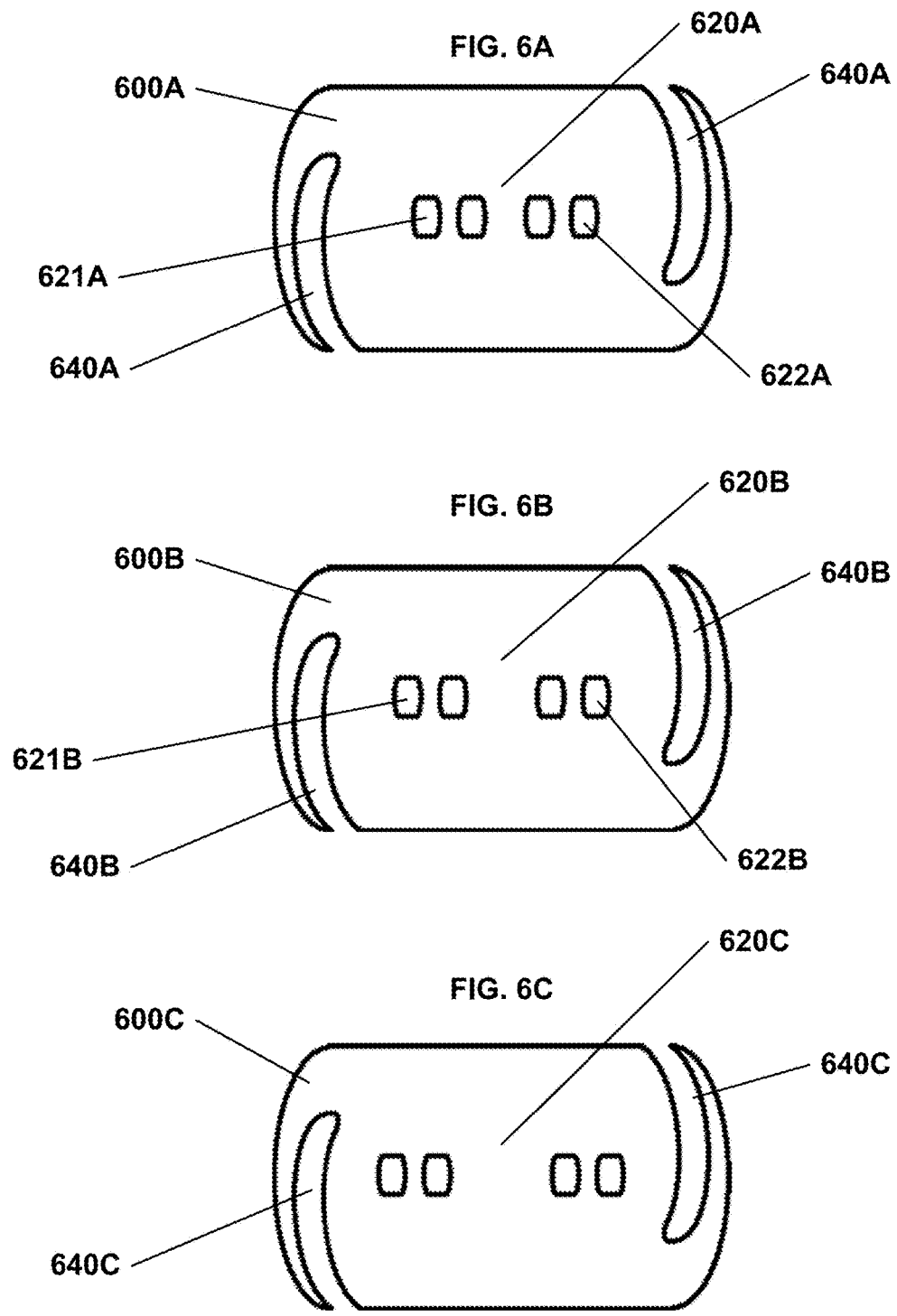
FIGS. 6A, 6B, and 6C are each a front view of several embodiments of a cord tensioning device comprising an irregular shaped device body, square shaped apertures and irregular, curved shaped recessed slots.

FIGS. 6A, 6B, and 6C each depict embodiments that are substantially the same as FIGS. 5A, 5B, and 5C, respectively, except that the device body 600A, 600B, and 600C in each of the embodiments in FIGS. 6A, 6B, and 6C may comprise two irregularly shaped recessed slots 640A, 640B, and 640C in the device body 600A, 600B, and 600C that curve outwardly from the center of the device body 600A, 600B, and 600C.

Figure 7:
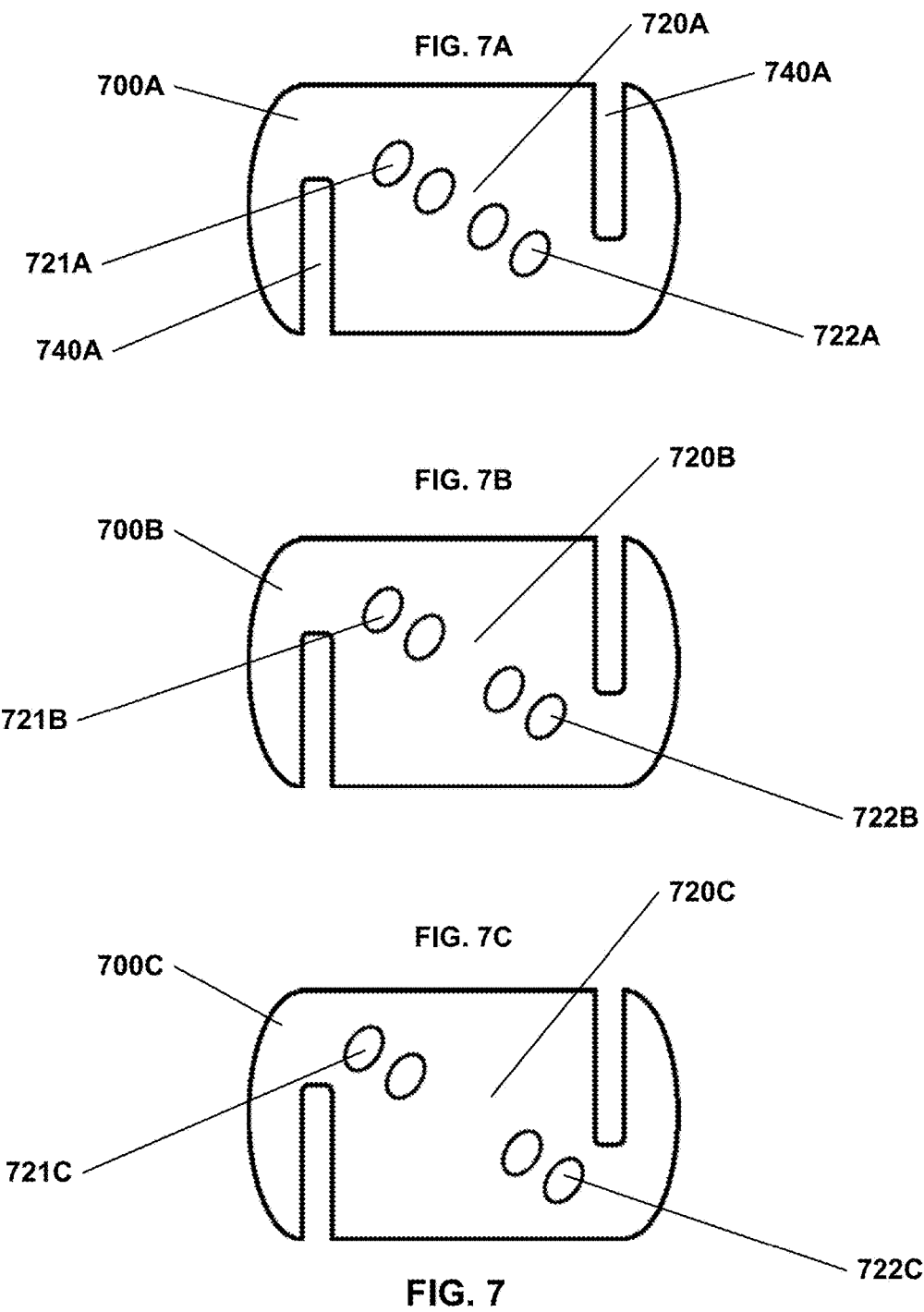
FIGS. 7A, 7B, and 7C are each a front view of several embodiments of a cord tensioning device comprising an irregular shaped device body, oval shaped apertures located on an angled axis, and rectangular shaped recessed slots.

FIGS. 7A, 7B, and 7C each depict embodiments that are substantially the same as FIGS. 5A, 5B, and 5C, respectively, except that each of the embodiments in FIGS. 7A, 7B, and 7C may comprise a device body 700A, 700B, and 700C where the apertures 720A, 720B, and 720C may be located along a downward slanted line going from the left edge to the right edge of the device body 700A, 700B, and 700C.

Figure 8:
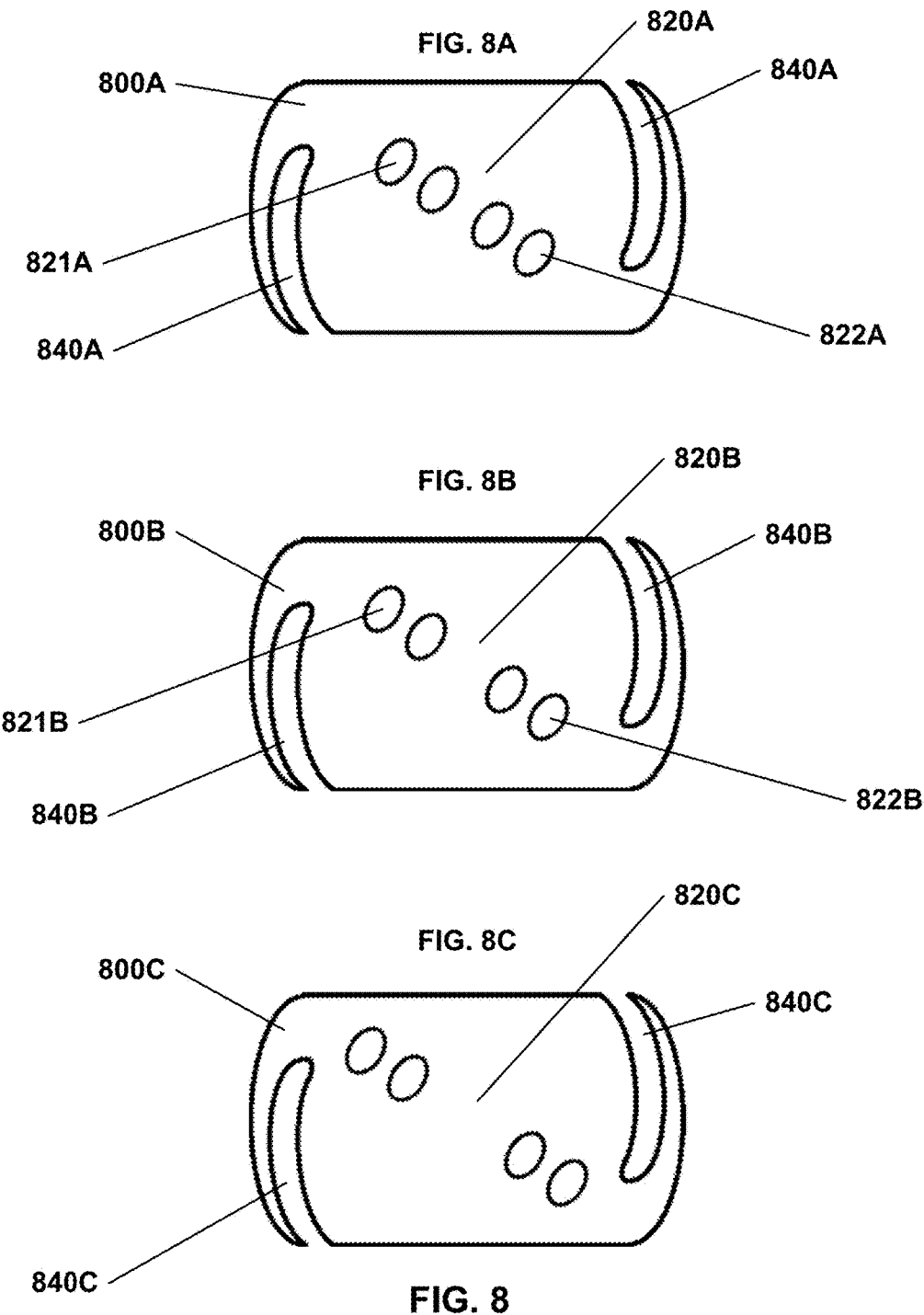
FIGS. 8A, 8B, and 8C are each a front view of several embodiments of a cord tensioning device comprising an irregular shaped device body, oval shaped apertures located on an angled axis, and irregular, curved shaped recessed slots.

FIGS. 8A, 8B, and 8C each depict embodiments that are substantially the same as FIGS. 7A, 7B, and 7C, respectively, except that the device body 800A, 800B, and 800C in each of the embodiments in FIGS. 8A, 8B, and 8C may comprise two irregularly shaped recessed slots 840A, 840B, and 840C in the device body 800A, 800B, and 800C that may curve outwardly from the center of the device body 800A, 800B, and 800C.

Figure 9:
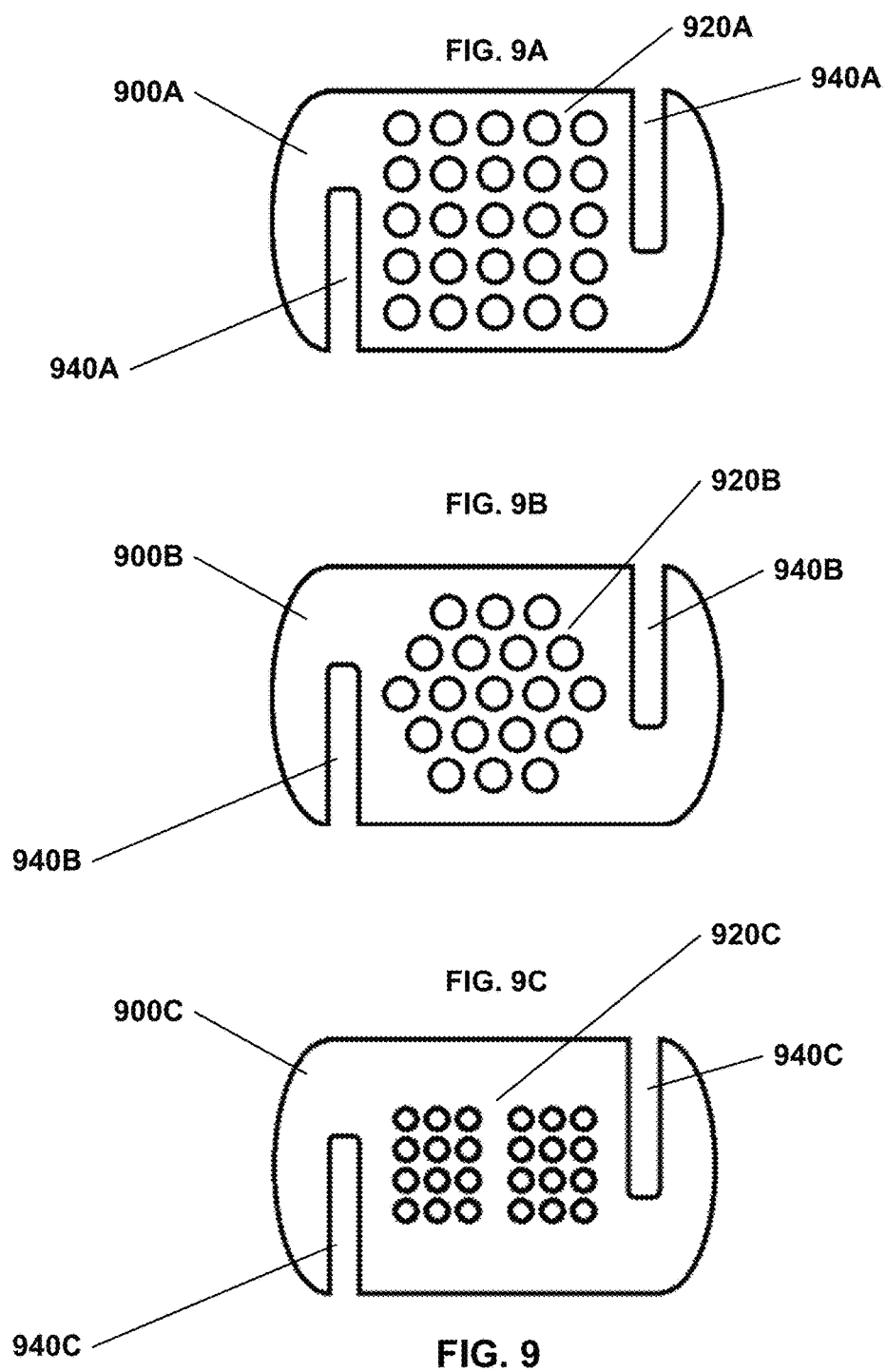
FIGS. 9A, 9B, and 9C are each a front view of several embodiments of a cord tensioning device comprising an irregular shaped device body, an array of apertures, and rectangular shaped recessed slots.

FIGS. 9A, 9B, and 9C each depict embodiments that are substantially the same as FIGS. 5A, 5B, and 5C, respectively, except that each of the embodiments in FIGS. 9A, 9B, and 9C depicts a device body 900A, 900B, and 900C which may comprise an array of circular apertures 920A, 920B, and 920C arranged in a different two-dimensional configuration on the device body 900A, 900B, and 900C. FIG. 9A depicts an embodiment where the array of apertures 920A may be arranged in a 5x5 configuration on the device body 900A. FIG. 9B depicts an embodiment where the array of apertures 920B may be arranged in a hexagonal configuration on the device body 900B. FIG. 9C depicts an embodiment where the array of apertures 920C may be arranged in two (2) separate 3x4 configurations.

Figure 10:
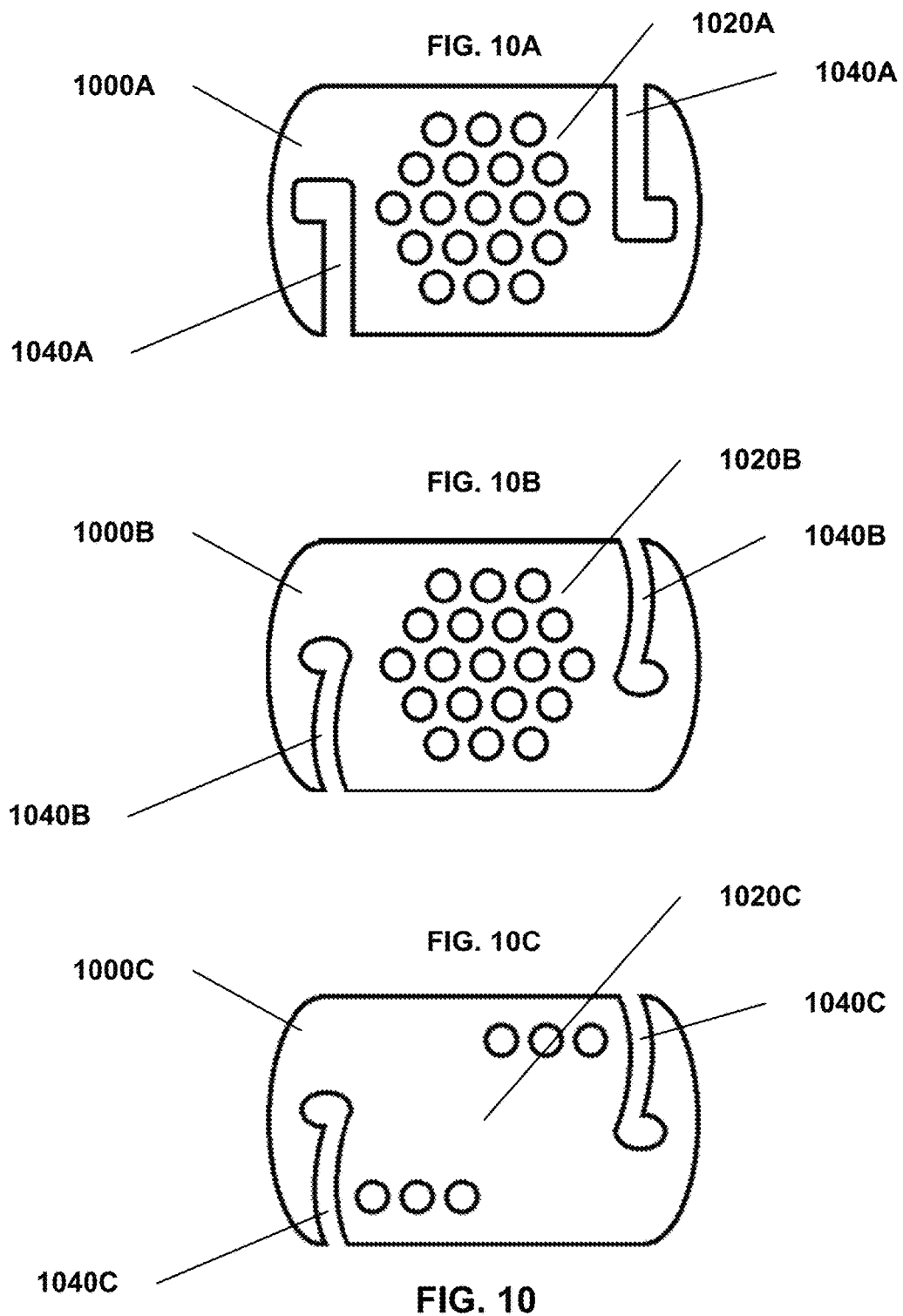
FIGS. 10A, 10B, and 10C are each a front view of several embodiments of a cord tensioning device comprising an irregular shaped device body and an array of apertures (FIGS. 10A and 10B) or apertures arranged in opposite corners of the device body (FIG. 10C), and L-shaped (FIG. 10A) or curved shaped (FIGS. 10B and 10C) recessed slots.

FIGS. 10A, 10B, and 13B each depict embodiments that are substantially the same as FIG. 9B, where the device bodies 1000A, 1000B, and 1300B comprise an array of apertures 1020A, 1020B, and 1320B that are circular and arranged in a hexagonal array, except that each of the embodiments in FIGS. 10A, 10B, and 13B depicts two different types of irregularly shaped recessed slots 1040A, 1040B, and 1340B. In FIG. 10A, the recessed slots 1040A may comprise an irregular shape that resembles an L-shape which may be comprised of straight lines and chamfered corners. In FIGS. 10B and 13B, the recessed slots 1040B and 1340B may curve outwardly from the center of the device body 1000B and 1300B.

FIG. 10C depicts an embodiment that is substantially the same as FIG. 10B, except that the device body 1000C may contain six circular apertures 1020C located near opposite corners of the device body 1000C. The apertures 1020C may be biased to the left and right edges and to the top and bottom edges having spacings that are non-uniform (e.g., the first, second, and third apertures of the six apertures 1020C may be located closer to the left and bottom edges of the device body 1000C, and the fourth, fifth, and sixth apertures of the six apertures 1020C may be located closer to the right and top edges of the device body 1000C, where the spacing between the third and fourth apertures may be different from the spacing between the first, second, and third apertures).

Figure 11:
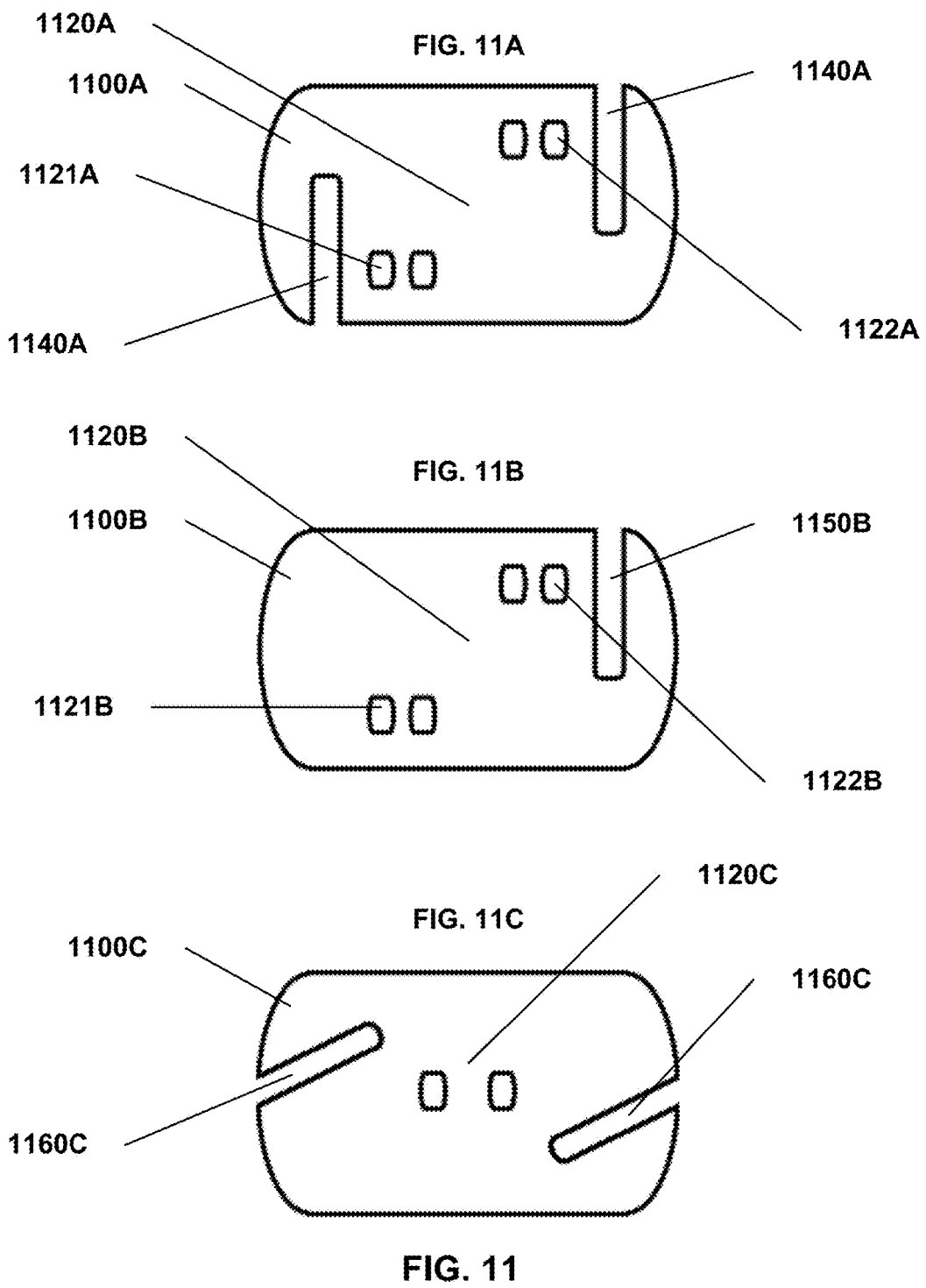
FIGS. 11A, 11B, and 11C are each a front view of several embodiments of a cord tensioning device comprising an irregular shaped device body, square shaped apertures, and at least one rectangular shaped recessed slot.

FIG. 11A depicts one embodiment where the device body 1100A may comprise an irregular shape and may contain four apertures 1120A located near opposite corners of the device body 1100A. Each of the four apertures 1120A may comprise a regular shape, and the apertures 1120A may be biased to the left and right edges and to the top and bottom edges having spacings that are non-uniform (e.g., the first and second apertures 1121A of the four apertures 1120A may be located closer to the left and bottom edges of the body, and the third and fourth apertures of the four apertures 1122A may be located closer to the right and top edges of the device body 1100A, where the spacing between the first and second apertures of the four apertures 1120A may be different from the spacing between the third and fourth apertures of the four apertures 1120A, and the spacing between the second and third apertures of the four apertures 1120A may be larger than the other spacings between the other apertures 1120A). This embodiment may further comprise two regularly shaped recessed slots 1140A in the device body 1100A, one of which may be disposed along the top right edge of the device body 1100A extending toward the bottom edge of the device body 1100A and the other of which may be disposed along the bottom left edge of the device body 1100A extending toward the top of the device body 1100A.

FIG. 11B depicts an embodiment that is substantially the same as FIG. 11A, except that the device body 1100B may comprise one regularly shaped recessed slot 1150B which may be disposed along the top right edge of the device body 1100B extending toward the bottom edge of the device body 1100B.

FIG. 11C depicts one embodiment where the device body 1100C may comprise an irregular shape and may contain two apertures 1120C located near the center of the device body 1100C, and the device body 1100C may comprise two regularly shaped recessed slots 1160C which may be disposed along the left edge and right edge of the device body 1100C extending diagonally towards the top edge and the bottom edge, respectively.

FIG. 13C depicts an embodiment that is substantially similar to FIG. 13A except that the device body 1300C may comprise an aperture 1370C located on the edge of the device body 1300C which may extend through the device body 1300C, in addition to the apertures 1320C extending from the front to the back of the device body 1300C.

Alternatively, one or more apertures 1370C may extend completely through body 1300C instead of apertures 1320C.

Method of Tightening a Cord Around an Object

According to certain embodiments, the cord may be a free standing cord that may be used with the cord tensioning device to tighten the cord around any object. The cord may be made of a flexible, sturdy material that allows the cord to fold upon itself to create knots, loops, etc. The cord may further comprise two free ends. According to certain embodiments, the cord may consist of a single cord having two free ends, or may comprise multiple cords/cord segments having ends, which may be connected to one another such that the assembly of cords/cord segments may comprise two free ends, each of the free ends belonging to a different cord/cord segment, or may comprise one free end and one end affixed to the device body or to the garment being tightened.

Figure 12:
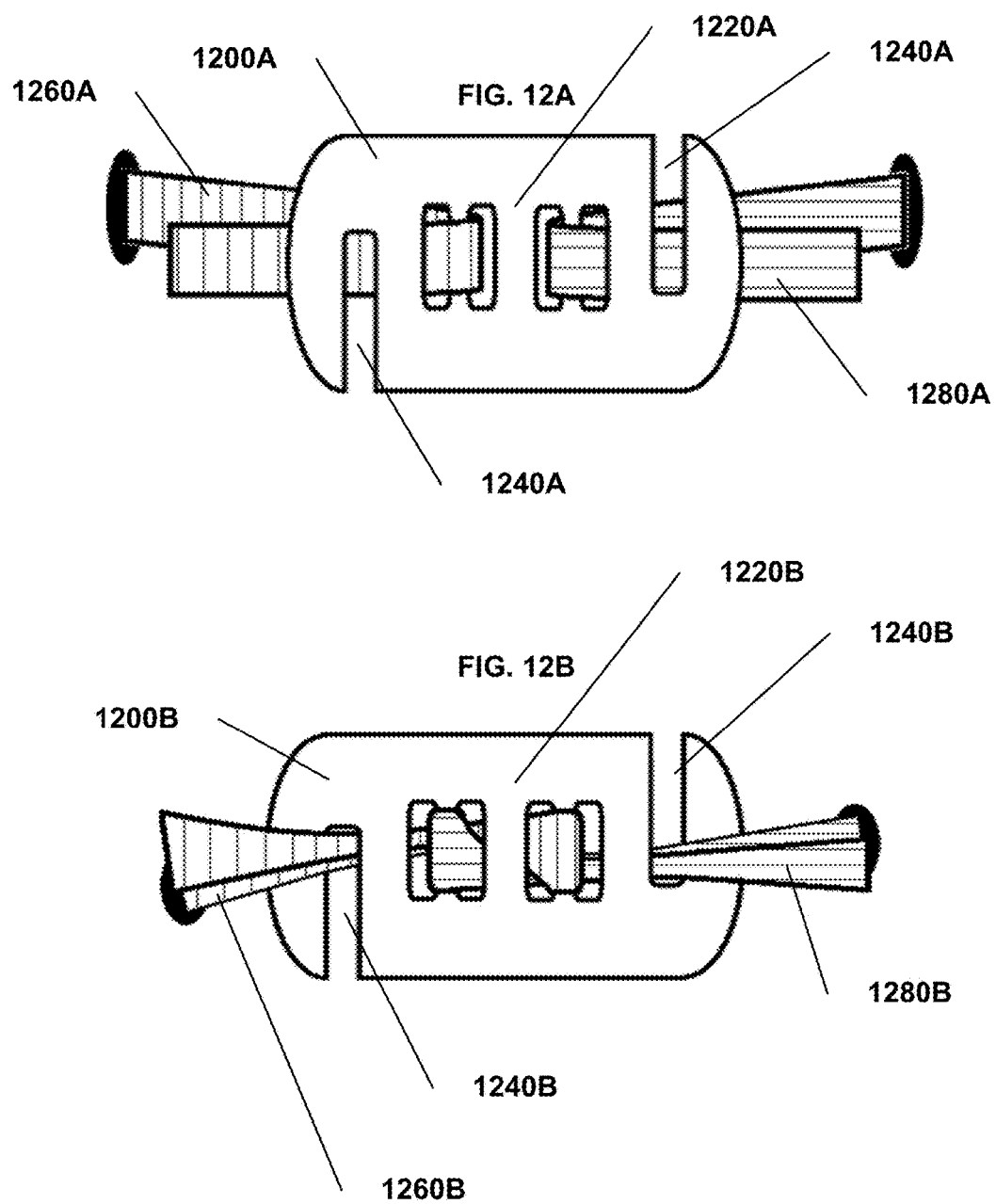
FIGS. 12A and 12B are each a front view illustrating one embodiment of the method steps of tightening a cord around an object.

FIGS. 12A and 12B depict an explanatory illustration of one embodiment of the tightening method which may be used to tighten a cord about an object using four apertures 1240A and 1240B. The method for tightening a cord around an object may comprise the following:

1. Insert the first free end of the two free ends 1280A and 1280B of the cord into a first of the apertures 1220A and 1220B. According to certain embodiments, the first aperture may be located near the center of the device body 1200A and 1200B.
2. Insert the same first free end of the cord 1280A and 1280B into a second of the apertures 1220A and 1220B. According to certain embodiments, the second aperture may be located on the periphery of all the apertures 1220A and 1220B (i.e., aperture furthest towards either the left or right side of the device body). The first free end may enter the second aperture from the front side and extend through to the back side of the device body 1200A and 1200B, thereby effectively forming a loop around the spacing between at least two apertures 1220A and 1220B.
3. Insert the second free end of the two free ends of the cord 1280A and 1280B into a third of the apertures 1220A and 1220B disposed in the device body 1200A and 1200B. According to certain embodiments, the third aperture may be located near the center of the device body 1200A and 1200B. The second free end of the cord 1280A and 1280B enters the aperture from the back side and extends through to the front side of the device body 1200A and 1200B.

4. Insert the same second free end of the cord into a fourth of the apertures 1220A and 1220B. According to certain embodiments, the fourth aperture may be located on the periphery of all the apertures 1220A and 1220B (e.g., aperture furthest towards either the right or left edge of the body). The second free end may enter the aperture from the front side and extend through to the back side of the device body, thereby effectively forming a loop around the spacing between at least two apertures 1220A and 1220B.
5. Pull the first and second free ends of the cord 1280A and 1280B simultaneously in opposing directions, away from the center of the device body 1200A and 1200B (e.g., pull the first free end towards the left and the second free end towards the right) to initially tighten the cord 1280A and 1280B around the object. The cord 1280A and 1280B is frictionally retained within the apertures 1220A and 1220B of the device body 1200A and 1200B such that the cord 1280A and 1280B is tightened around the object.
6. Once the cord 1280A and 1280B is frictionally held within the device body 1200A and 1200B, rotate the device body 1200A and 1200B in a clockwise or counterclockwise direction to incrementally tighten the cord 1280A and 1280B around the object further.
7. Once the desired final tightened state is achieved, insert the cord portions 1260A and 1260B closest in proximity to the recessed slots 1240A and 1240B (i.e., cord portion located around the object and cord portion containing free end) within the corresponding recessed slots 1240A and 1240B located on the device body 1200A and 1200B, such that the cord portions 1260A and 1260B are hooked within and frictionally retained within the recessed slots 1240A and 1240B, thereby keeping the cord in its final tightened state around the object. If the device body 1200A and 1200B is rotated clockwise, the cord experiences a counterclockwise torque, which is balanced by hooking the cord portions 1260A and 1260B within the recessed slots 1240A and 1240B, effectively "locking" the cord tightening device in place.

The above embodiment of the method of tightening a cord around an object utilizes a cord tensioning device comprising four apertures. As described above, the cord tensioning device encompasses multiple embodiments, and utilizing one embodiment over another may result in variations to the method steps outlined above. For example, according to certain embodiments, recessed slots may comprise an irregular shape, which may include additional notched features within the recessed slots, which may act to further securely retain the cord portions within the recessed slots. According to certain embodiments, the device body may comprise four apertures or more, and the free ends of the cord may be looped through additional apertures to provide greater frictional engagement between the device body and the cord. In other embodiments, the device body may comprise less than four apertures. Still, in other embodiments, the device body may comprise one recessed slot.

Figure 14:
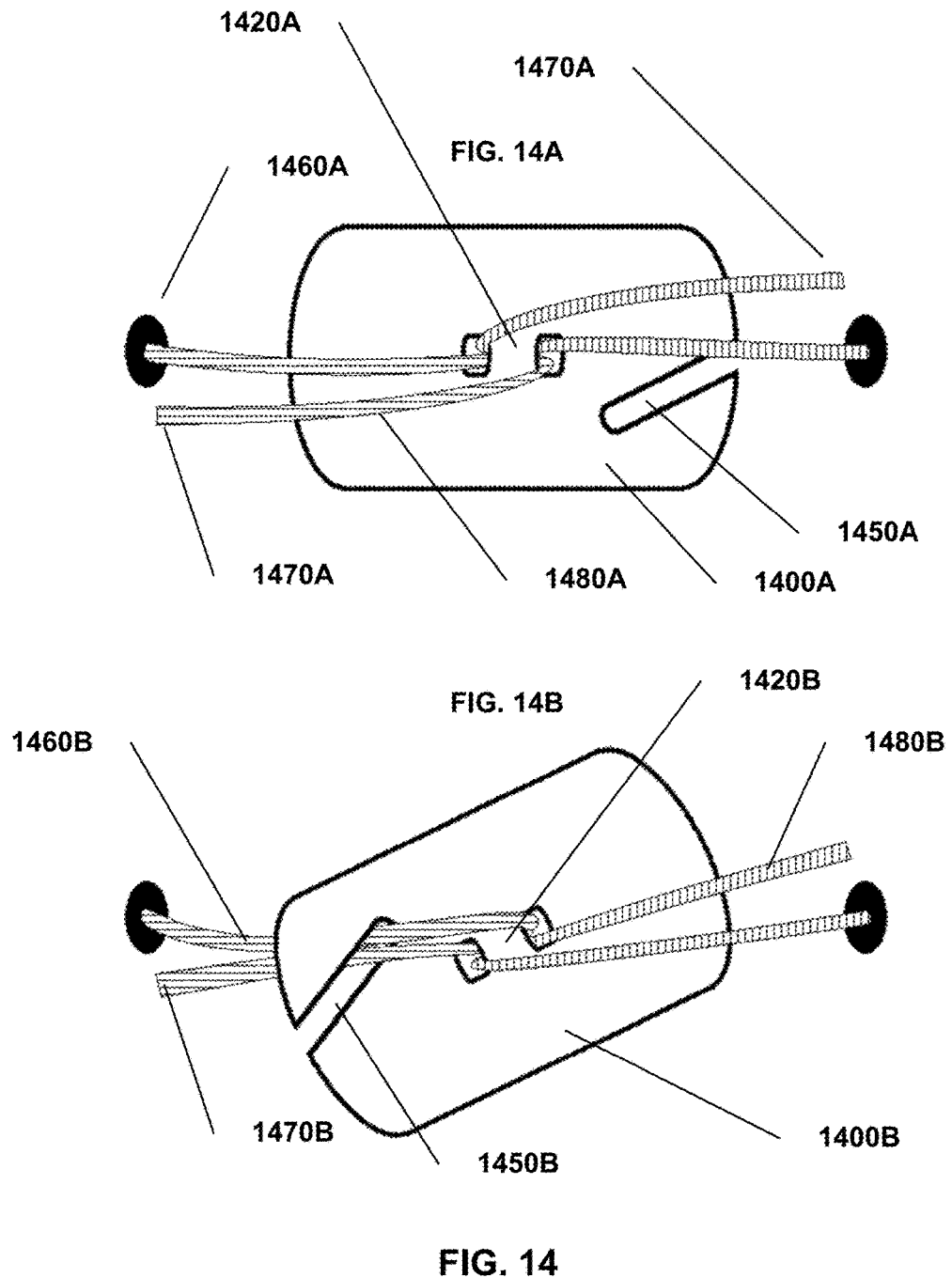
FIGS. 14A and 14B are each a front view illustrating another embodiment of the method steps of tightening a cord around an object.

FIGS. 14A and 14B depict an explanatory illustration of another embodiment of the tightening method which may be used to tighten a cord about an object using two apertures 1420A and 1420B and one recessed slot 1450A and 1450B. The method for tightening a cord around an object may also comprise the following:

1. As shown in FIG. 14B, insert the first free end of the two free ends of the cord 1480A into a first of the at least two apertures 1420A disposed in the device body. According to certain embodiments, the apertures 1420 may be located near the center of the device body 1400A. According to certain embodiments, the aperture may be located on the edge of the device body 1400A and extend through the device body 1400A to any other edge or side of the device body 1400A.
2. Insert the same first free end of the cord 1480A into a second aperture of the at least two apertures 1420A. The first free end may enter the second aperture from the back side and extend through to the front side of the device body 1400A, thereby effectively forming a loop around the spacing between the at least two apertures 1420A.
3. Insert the second free end of the two free ends of the cord 1480A into one of the at least two apertures 1420A disposed in the device body 1400A. According to certain embodiments, the aperture may be located near the center of the device body 1400A. The second free end of the cord 1480A enters the aperture from the front side and extends through to the back side of the device body 1400A.
4. Insert the same second free end of the cord into another aperture of the at least two apertures 1420A. The second free end may enter the aperture from the back side and extend through to the front side of the device body 1400A, thereby effectively forming a loop around the spacing between the at least two apertures 1420A.
5. Pull the first and second free ends of the cord 1480A simultaneously in opposing directions, away from the center of the device body 1400A (e.g., pull the first free end towards the left and the second free end towards the right) to initially tighten the cord 1480A around the object. The cord 1480A is frictionally retained within the at least two apertures 1420A of the device body 1400A such that the cord 1480A is tightened around the object.
6. Once the cord 1480A is frictionally held within the device body 1400A, rotate the device body 1400A in a clockwise or counterclockwise direction to incrementally tighten the cord 1480A around the object further, as shown in FIG. 14B.
7. Once the desired final tightened state is achieved, insert the cord portion 1460A closest in proximity to the recessed slot 1450A (i.e., cord portion located around the object and cord portion containing free end) within the corresponding recessed slot 1450A located on the device body 1400A, such that the cord portion 1460A is hooked within and frictionally retained within the recessed slot 1450A, thereby keeping the cord in its final tightened state around the object. If the device body 1400A is rotated clockwise, the cord experiences a counterclockwise torque, which is balanced by hooking the cord portion 1460 within the recessed slot 1450A, effectively "locking" the cord tightening device in place, as shown in FIG. 14B.

Alternatively, one free end 1470A of each cord 1480A may pass through a corresponding aperture 1420A. A knot may then be tied in each end 1470A to prevent the ends from coming out of apertures 1420A. Body 1400A may then be rotated as described above.

FIGS. 15A, 15B, and 15C depict an explanatory illustration of another embodiment of the tightening method which may be used to tighten a cord about an object using six apertures 1540A, 1540B, and 1540C. The method for tightening a cord around an object may also comprise the following:

1. As shown in FIG. 15A, insert the first free end 1570A of the two free ends 1520 of the cord 1580A into a first of the apertures 1520A disposed in the device body. According to certain embodiments, the aperture may be located near the corner of the device body 1500A. The first free end 1570A of the cord 1580A may enter the first aperture from the front side and may extend through to the back side of the device body 1500A.
2. Insert the same first free end 1570A of the cord 1580A into a second of the apertures 1520A from the back side to the front side of the device body 1500A.
3. Insert the same first free end 1570A of the cord 1580A into a third of the apertures 1520A from the front side to the back side of the device body 1500A.
4. Insert the same first free end 1570A of the cord 1580A into the first aperture 1520A. The first free end 1570A may enter the aperture from the back side and extend through to the front side of the device body 1500A, thereby effectively forming a loop around the spacing between at least two apertures 1520A.
5. Insert the second free end 1570A of the two free ends of the cord 1580A into a fourth of the apertures 1520A disposed in the device body 1500A. According to certain embodiments, the fourth aperture may be located near the opposite corner of the device body 1500A. The second free end 1570A of the cord 1580A enters the fourth aperture from the front side and extends through to the back side of the device body 1500A.
6. Insert the same second free end 1570A of the cord 1580A into a fifth aperture of the apertures 1520A from the back side to the front side of the device body 1500A.
7. Insert the same second free end 1570A of the cord 1580A into a sixth aperture of the apertures 1520A from the front side to the back side of the device body 1500A.
8. Insert the same second free end 1570A of the cord 1580A into the fourth aperture of the apertures 1520A. The second free end may enter the fourth aperture from the back side and extend through to the front side of the device body 1500A, thereby effectively forming a loop around the spacing between at least two apertures 1520A.
9. Pull the first and second free ends 1570A of the cord 1580A simultaneously in opposing directions, away from the center of the device body 1500A (e.g., pull the first free end 1570A towards the left and the second free end 1570A towards the right) to initially tighten the cord 1580A around the object. The cord 1580A is frictionally retained within the apertures 1520A of the device body 1500A such that the cord 1580A is tightened around the object.
10. As shown in FIG. 15B, once the cord 1580B is frictionally held within the device body 1500B, rotate the device body 1500B in a clockwise or counterclockwise direction to incrementally tighten the cord 1580B around the object further.
11. As shown in FIG. 15C, once the desired final tightened state is achieved, insert the cord portions 1560C closest in proximity to the recessed slots 1540C within the corresponding recessed slots 1540C located on the device body 1500C, such that the cord portions 1560C are hooked within and frictionally retained within the recessed slots 1540C, thereby keeping the cord in its final tightened state around the object. If the device body 1500C is rotated clockwise, the cord experiences a counterclockwise torque, which is balanced by hooking the cord portions 1560C within the recessed slots 1540C, effectively "locking" the cord tightening device in place.

What is claimed is:

1. A cord tensioning device comprising:
   a rotatable body having
      a front side,
      a back side,
      a left edge,
      a right edge,
      a top edge, and
      a bottom edge;
   at least two apertures disposed through said body configured to securely receive a cord; wherein one of said at least two apertures is further disposed through one of said edges of the body, and entirely within the body; and
   at least one recessed slot disposed in said rotatable body wherein said at least one recessed slot extends from any of said edges, said recessed slot configured to restrain rotation of the rotatable body about a tightened cord.

2. The cord tensioning device of claim 1, wherein the body of said cord tensioning device is formed of a single piece.

3. The cord tensioning device of claim 1, wherein said at least one recessed slots comprises an irregular shape.

4. The cord tensioning device of claim 1, wherein said at least two apertures are an array of apertures, wherein multiple apertures are arranged in multiple directions.

5. The cord tensioning device of claim 1, wherein the body of said cord tensioning device is formed of a semi-rigid material.

6. In combination, a cord tensioning device and at least one cord incorporated into said cord tensioning device,
   said cord tensioning device comprising:
      a rotatable body having
         a front side,
         a back side,
         a left edge,
         a right edge,
         a top edge, and
         a bottom edge;
      at least two apertures disposed through said body configured to securely receive a cord; wherein one of said at least two apertures is further disposed through one of said edges of the body, and entirely within the body; and
      at least one recessed slot disposed in said rotatable body wherein said at least one recessed slot extends from at least one of said edges, said recessed slot configured to restrain rotation of the rotatable body about a tightened cord;
   said at least one cord comprising:
      a first end, wherein said first end enters one of said at least two apertures of said cord tensioning device and exits another of said at least two apertures of said cord tensioning device;
      a second end, wherein said second end enters one of said at least two apertures of said cord tensioning device and exits another of said at least two apertures of said cord tensioning device; and an engagement portion, wherein said at least one recessed slot selectively engages the at least one cord at said engagement portion to prevent the cord tensioning device from rotating.

7. The combination as in claim 6, wherein said at least one cord is two cords with a first of said two cords comprising said first end, and a second of said two cords comprising said second end.

8. The combination as in claim 6, wherein said at least one cord is comprised of rope, string, belt, or woven fabric.

9. The combination as in claim 6, wherein the body of said cord tensioning device is formed of a single piece.

10. The combination as in claim 6, wherein said at least one recessed slot comprises an irregular shape.

11. The combination as in claim 6, wherein said at least two apertures comprises an irregular shape.

12. The combination as in claim 6, wherein said at least two apertures are an array of apertures, wherein multiple apertures are arranged in multiple directions.

13. The combination as in claim 6, wherein the body of said cord tensioning device is formed of a semi-rigid material.

\* \* \* \* \*